United States Patent [19]
Scherch et al.

[11] Patent Number: 5,690,207
[45] Date of Patent: Nov. 25, 1997

[54] WINDSHIELD WIPER CLUTCH ASSEMBLY

[75] Inventors: Richard P. Scherch, Johnston, Iowa; Robert E. Neer, Urbana, Ohio

[73] Assignee: Grimes Aerospace Company, Urbana, Ohio

[21] Appl. No.: 621,660

[22] Filed: Mar. 26, 1996

[51] Int. Cl.⁶ .................................................. B60S 1/18
[52] U.S. Cl. ................................ 192/138; 15/250.16
[58] Field of Search ........................... 15/250.16, 250.17; 74/70; 192/45.1, 41 A, 138

[56] References Cited

U.S. PATENT DOCUMENTS

| | | | |
|---|---|---|---|
| 396,244 | 1/1889 | Smith . | |
| 474,934 | 5/1892 | Winans . | |
| 1,096,781 | 5/1914 | Erickson . | |
| 2,675,898 | 4/1954 | Morgan | 192/41 |
| 2,699,683 | 1/1955 | Castner | 74/70 |
| 2,878,505 | 3/1959 | Ziegler | 15/250.4 |
| 2,919,588 | 1/1960 | Sundt | 74/76 |
| 2,960,881 | 11/1960 | Perry et al. | 74/70 |
| 2,971,388 | 2/1961 | Koppel | 74/77 |
| 3,048,045 | 8/1962 | Ryck et al. | 74/75 |
| 3,091,128 | 5/1963 | De Rees et al. | 74/75 |
| 3,716,887 | 2/1973 | Bellware | 15/250.17 |
| 4,173,055 | 11/1979 | Izumi et al. | 15/250.02 |
| 4,395,890 | 8/1983 | Goodlaxson | 68/23.7 |
| 4,400,844 | 8/1983 | Hayakawa et al. | 15/250.16 |
| 4,475,642 | 10/1984 | Fritz | 198/345 |
| 4,494,421 | 1/1985 | Matuoka | 74/600 |
| 4,543,839 | 10/1985 | Buchanan, Jr. et al. | 74/98 |
| 4,599,546 | 7/1986 | Uemura | 318/443 |
| 4,783,876 | 11/1988 | Souma et al. | 15/250.17 |
| 4,794,818 | 1/1989 | Eustache et al. | 15/250.16 X |
| 4,798,102 | 1/1989 | Buschur et al. | 15/250.16 X |
| 4,944,375 | 7/1990 | Ohta et al. | 192/8 R |
| 4,945,600 | 8/1990 | Gastmann | 15/250.01 |
| 5,024,308 | 6/1991 | Kinoshita et al. | 192/45.1 X |
| 5,142,729 | 9/1992 | Imamura | 15/250.16 |

FOREIGN PATENT DOCUMENTS 815657 7/1959 United Kingdom .

*Primary Examiner*—Rodney H. Bonck
*Attorney, Agent, or Firm*—Standley & Gilcrest

[57] ABSTRACT

A clutch mechanism for use in a windshield wiper system having a park eccentric, the clutch incorporates a unidirectional sprag clutch bearing and a torsional return spring to provide the clutch function.

7 Claims, 2 Drawing Sheets

WINDSHIELD WIPER CLUTCH ASSEMBLY

BACKGROUND AND SUMMARY OF THE INVENTION

The present invention relates generally to windshield wiper systems, and more particularly, to a windshield wiper clutch assembly.

It has been known to use a wrap spring clutch mechanism to assist in the driving of a windshield wiper arm assembly. A unidirectional electric motor has been used to drive a worm gear journalled on a sleeve having an eccentric through bore within which a crank shaft is journalled. A crank arm is connected by suitable linkage means to oscillate a wiper blade throughout its normal running stroke between predetermined inboard and outboard stroke end limits.

Depressed park windshield wiper systems usually include a pair of spaced drive pivots rotatably supported by the body structure of the vehicle and to which windshield wipers are mounted. A drive mechanism including a rotary output shaft, a crank arm attached to the output shaft, and a drive transmission or linkage connected with the drive pivots and the crank arm are for reciprocating the windshield wipers between inboard and outboard positions in response to the rotation of the crank arm. The drive mechanism of such systems have also included means for eccentrically shifting the output shaft to increase the throw of the crank arm to effect movement of the wipers from their inboard position to a depressed park position adjacent the lower edge of the windshield when wiper operation is being terminated. Cam operated park switches are generally provided for de-energizing the drive mechanism upon the wipers reaching their depressed park position.

Known wiper systems, as described above, use a wrap spring clutch mechanism to accomplish shifting of the eccentric. The present invention has been designed to eliminate the need for a wrap spring clutch mechanism. Disadvantages of the wrap spring clutch have resulted in a need for a new device that will perform the required clutch function but without the noted disadvantages. The wrap spring clutch is known to have energy losses due to friction, it has a history of being unreliable, the wrap spring clutch mechanism is difficult and costly to manufacture, and it does not have a long life.

The present invention comprises a unidirectional sprag clutch bearing and a torsional return spring to provide a similar clutch function as provided by a wrap spring. A park eccentric is located within a 4-bar link using a slip fit interface and is retained via a shoulder on the eccentric and a snap ring. The sprag clutch is retained in the eccentric via a press fit. The torsional return spring is clamped in place using the clutch eccentric stop block. The park eccentric is free to rotate in either direction, its position being determined by the input shaft rotation and the eccentric stop block.

The present invention resides in various novel constructions and arrangements of parts, and further objects, novel characteristics and advantages of the present invention will be apparent to those skilled in the art to which it relates and from the following detailed description of the illustrated embodiment thereof made with reference to the accompanying drawings forming a part of this specification.

DESCRIPTION OF PREFERRED EMBODIMENT(S)

The operation of a park eccentric clutch of the present invention is based upon two fundamentals. The first is that the park sequence is initiated from a known location. The second is that the wiper arm is stopped at a known location in a single attempt. The present windshield wiper system operates in either the run mode or the park mode. The run mode is the normal operating condition with the motor running in the forward direction. The park mode causes the motor to run in reverse, the park eccentric to rotate and the wiping element to be driven into a park position.

Figure 1:
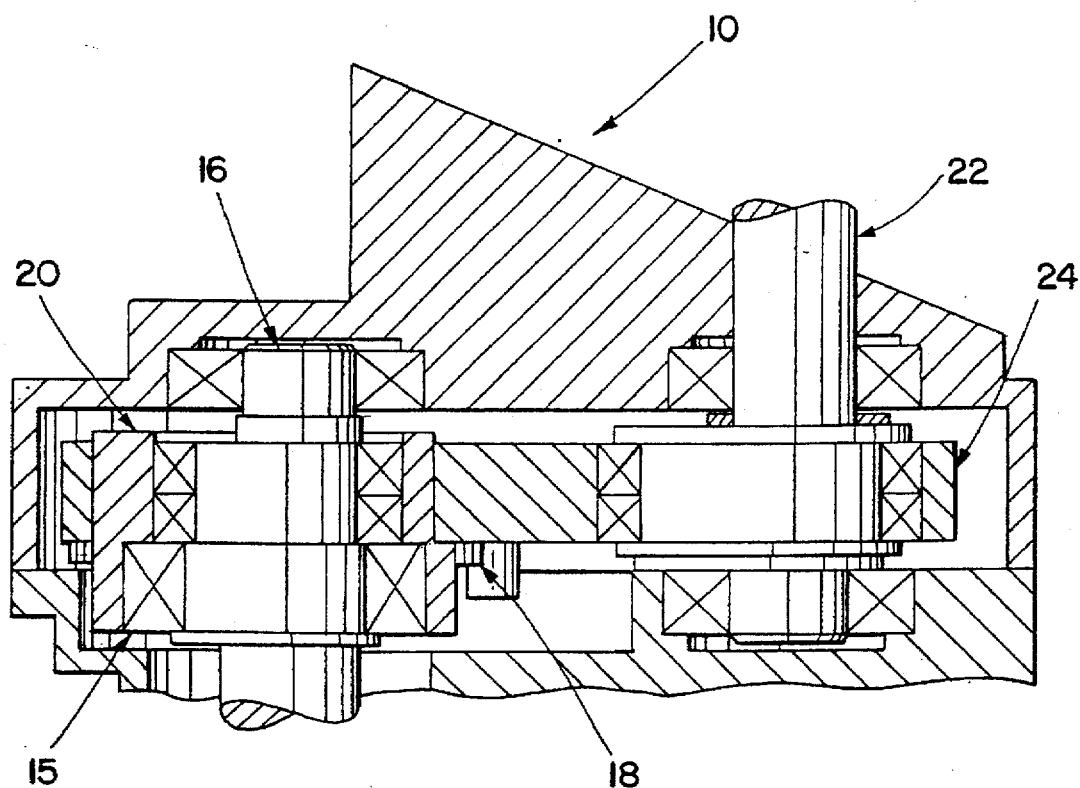
FIG. 1 is a fragmentary cross-sectional view of the windshield wiper system and clutch mechanism of the present invention.
Figure 2:
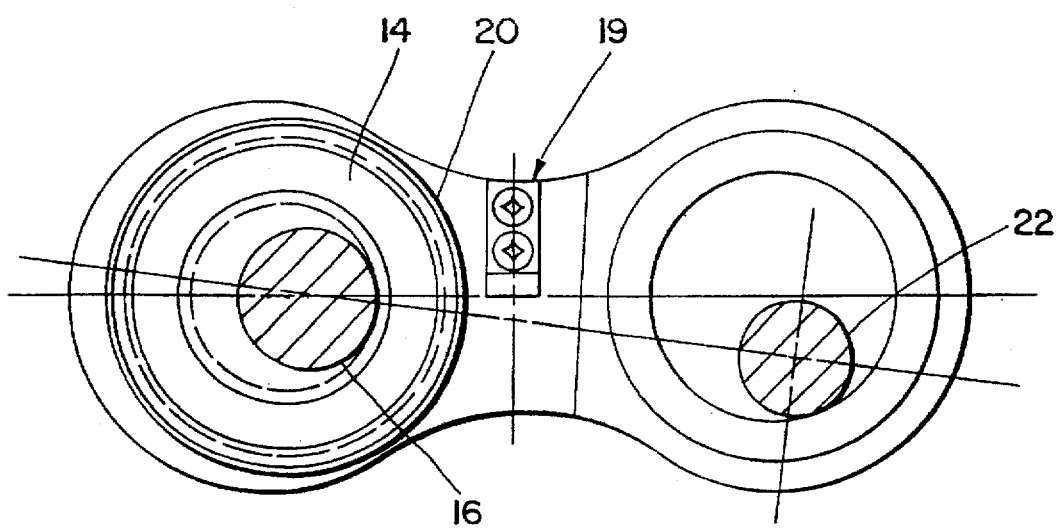
FIG. 2 is a view taken along lines 2—2 of the FIG. 1.

The new clutch mechanism 14 of the present invention will operate in the run and park modes as shown in the figures and as described hereinafter. During run mode operation, the sprag clutch bearing 15 will free wheel with the input shaft 16 rotation. As shown in FIG. 1 the input shaft 16 may have multiple segments of different diameters. The torsional return spring 18 will be in its minimum tension position. Within this set of constraints, the park eccentric 20 will be positioned for operation in the run mode. A clutch eccentric stop block 19, as shown in FIG. 2, may be secured to the unit 10 to limit rotation of the eccentric 20 at a predetermined location.

Figure 3:
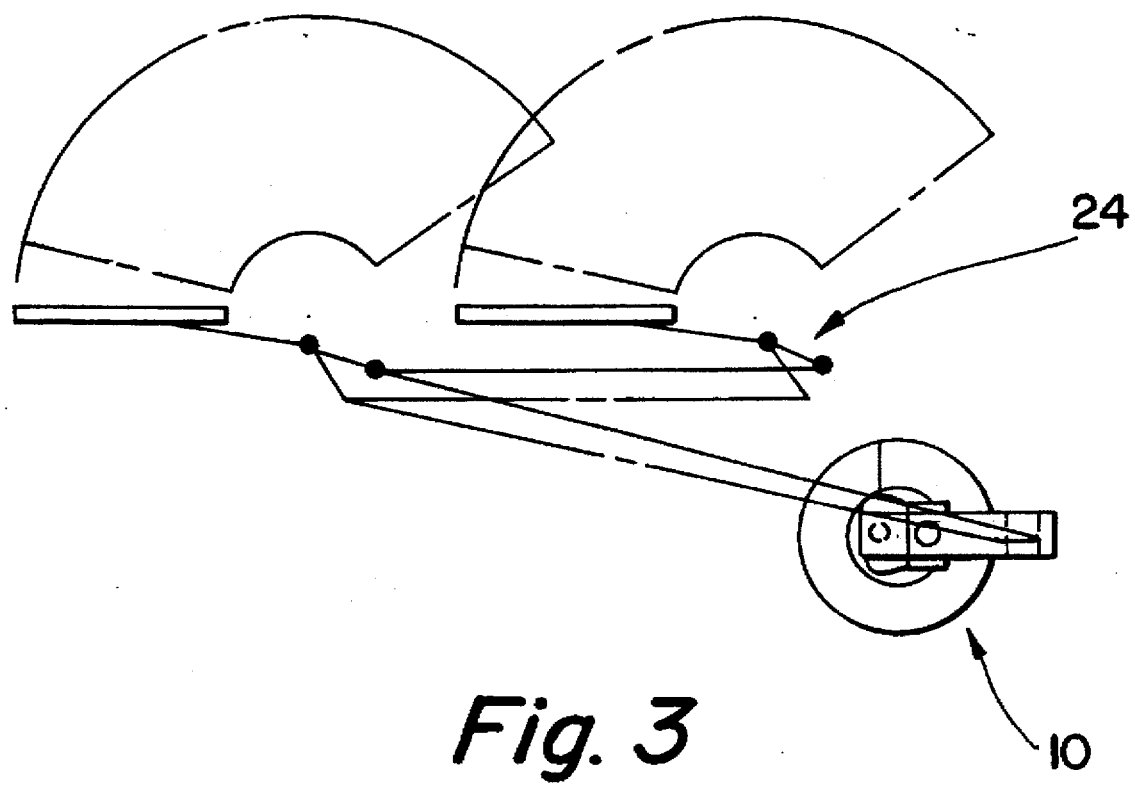
FIG. 3 shows a windshield wiper system linkage associated with the present invention.

Upon initiation of the park cycle, the output shaft 22 will travel to a predetermined position before motor reversal begins. The output shaft may be in association with a 4-bar crank 24 known to those of ordinary skill in the art, for example, as shown in FIG. 3. The motor reversal will cause a corresponding opposite rotation of the input shaft 16. The reversal of the input shaft rotation causes an instantaneous locking of the sprag clutch 14 onto the input shaft 16. This locking action in turn couples the park eccentric 20 into the input shaft 16, allowing the park eccentric 20 to be rotated into the park mode operating position. Simultaneously, as the eccentric 20 rotates, the torsional return spring 18 is placed in tension. When an output shaft position sensor senses the park position, the wiper system is stopped and powered down.

When the unit 10 is started after a park sequence, the rotation of the input shaft 16 in the forward direction instantaneously unlocks the sprag clutch 14. The torsional spring 18 that was placed in tension during the park cycle forces the park eccentric 20 to rotate to its run position.

The present invention will allow for direct transmission of the motor power to the gear train and output shaft without the losses due to friction associated with a wrap spring clutch. The present invention also results in lower operating temperatures within the gear case.

Although the illustrated embodiment hereof has been described in great detail, it should be apparent that certain modifications, changes and adaptations may be made in the illustrated embodiment, and that it is intended to cover all such modifications, changes and adaptations which come within the spirit of the present invention.

What is claimed is:

1. In a windshield wiper system having a linkage containing a park eccentric, a clutch assembly in association therewith, said clutch assembly comprising;

a sprag clutch having an inner race and an outer race, said outer race secured to said park eccentric;

a torsional return spring in association with said park eccentric; and an eccentric stop block mounted to said system to limit the rotation of said park eccentric.

2. The clutch assembly of claim 1, wherein said torsional return spring is in a state of minimum tension during a run mode operation of said system.

3. The clutch assembly of claim 1, wherein said inner race of said sprag clutch will turn with an input shaft from a drive motor.

4. The clutch assembly of claim 3, wherein a reversal of the direction of rotation of said input shaft will cause an instantaneous locking of said sprag clutch onto said input shaft.

5. The clutch assembly of claim 4, wherein said locking of said sprag clutch onto said input shaft couples said input shaft.

6. The clutch assembly of claim 5, wherein rotation of said park eccentric places said torsional return spring in tension.

7. A clutch assembly for a windshield wiper system, comprising:

an input shaft to said clutch assembly;

an output shaft in association with said clutch assembly, said output shark adapted to drive a windshield wiper arm linkage;

a sprag clutch having an inner race and an outer race, said inner race in association with said input shaft to turn as said input shaft turns; and a torsional return spring in association with said sprag clutch and a park eccentric such that during normal running operation of the windshield wiper system the torsional return spring will be in its minimum tension position but during the parking of the windshield wiper system the torsional return spring will be placed in tension.

* * * * *

UNITED STATES PATENT AND TRADEMARK OFFICE
CERTIFICATE OF CORRECTION

PATENT NO. : 5,690,207
DATED : Nov. 25, 1997
INVENTOR(S) : Richard P. Scherch, et al It is certified that error appears in the above-identified patent and that said Letters Patent is hereby corrected as shown below:

In column 4, line 5, please delete the word "shark" and replace it with -- shaft --.

Signed and Sealed this

Twenty-fourth Day of February, 1998

BRUCE LEHMAN

Attest:

Attesting Officer

Commissioner of Patents and Trademarks